United States Patent [19]
Ball

[11] Patent Number: 5,863,078
[45] Date of Patent: Jan. 26, 1999

[54] PIPE COUPLING

[76] Inventor: Daniel Graham Ball, 87 Woodland Rd., Darlington, County Durham, DL3 7UA, England

[21] Appl. No.: 530,192
[22] PCT Filed: Apr. 5, 1994
[86] PCT No.: PCT/GB94/00719
§ 371 Date: Nov. 21, 1995
§ 102(e) Date: Nov. 21, 1995
[87] PCT Pub. No.: WO94/23233
PCT Pub. Date: Oct. 13, 1994

[30] Foreign Application Priority Data

Apr. 3, 1993 [GB] United Kingdom ................... 9307083

[51] Int. Cl.$^6$ .................................................. F16L 35/00
[52] U.S. Cl. .......................... 285/24; 285/111; 285/336; 285/367; 285/910; 29/890.14
[58] Field of Search .............................. 285/336, 20, 367, 285/27, 416, 111, 410, 910; 277/205, 206, 214; 29/890.14

[56] References Cited

U.S. PATENT DOCUMENTS

| 2,777,715 | 1/1957 | Beyer | 285/336 X |
| 3,514,133 | 5/1970 | Besse | 285/336 |
| 3,594,022 | 7/1971 | Woodson | 285/336 |
| 3,836,159 | 9/1974 | Dryer | 285/336 X |
| 3,870,322 | 3/1975 | Marshall | 285/336 X |
| 5,076,617 | 12/1991 | Bronnert | 285/336 X |

FOREIGN PATENT DOCUMENTS

| 495493 | 4/1930 | Germany | 285/336 |
| 2149723 | 4/1972 | Germany | 285/336 |

Primary Examiner—Dave W. Arola

[57] ABSTRACT

A pipe coupling for coupling together two lengths of pipe comprising first and second collars or flanges secured to the ends of the lengths of pipe and having joining surfaces thereon which abut one another on securing the lengths of pipe together, radially aligned grooves are formed in the joining surfaces for receiving a seal which includes a rigid first seal component and a flexible second seal component bonded to the first seal component, the seal extending partially into both grooves to seal between the joining surfaces of the collars.

4 Claims, 2 Drawing Sheets

PIPE COUPLING

TECHNICAL FIELD

This invention relates to a pipe coupling used to join adjacent pipe lengths together to form a pipeline system.

BACKGROUND ART

A known pipe coupling comprises a clamp arrangement incorporating a clamp which embraces adjacent ends of adjacent pipe lengths. The clamp is tightened onto a seal so that the coupling can withstand the maximum pressure the pipeline is designed to carry.

The clamp arrangement may hold the pipe lengths together by friction in low pressure situations, or may co-operate with a groove or shoulder formed at each end of each pipe length in higher pressure situations.

Such clamp arrangements may be fixed into position by bolting or over centre clamping.

A problem with known clamp arrangements is that it is difficult to ensure accurate alignment of the internal bores of adjacent pipe lengths, primarily due to the resilience of the seal which can allow adjacent pipe lengths to move radially relative to one another, such as may occur as the clamp is being tightened onto the pipe lengths.

A known method of overcoming this problem is to design the pipe lengths to have one male end and one female end. Joins between adjacent pipe lengths are then made between the male end of one pipe length and the female end of another pipe length. This allows adjacent pip ee located accurately relative to one another and leads to alignment of the bores of adjacent pipe lengths.

A disadvantage with this known system, however, is that the pipe lengths can only be fitted into the pipeline in one direction.

It has been proposed, in U.S. Pat. No. 3,836,159, to provide a sealing ring reacting between the ends of adjacent pipe lengths and comprising a resilient, deformable plastics component sandwiched between inner and outer retainer rings of metal such as steel which are resiliently deformable in a direction radially of the pipe lenths.

In such an arrangement, the pressure in the pipeline reacts primarily on the metal components of the seal.

DISCLOSURE OF THE INVENTION

It would be desirable to be able to provide a pipe coupling which ensured positive and accurate alignment of adjacent pipe lengths, and therefore a smooth, continuous bore therethrough, the ends of adjacent pipe lengths being identical, and which incorporated a seal the efficiency of which increased with increasing pressure within the pipeline.

According to the present invention there is provided a pipe coupling for coupling together First and second lengths of pipe, the coupling comprising a first collar secures to an end of first length of pipe and having a joining surface thereto, a second collar secured to an end of the second length of pipe and having a joining surface thereto, the first and second collars being positioned such that, when adjacent ends of the first and second pipe lengths are brought into contact with one another, the joining surfaces of the first and second collars also contact one another, the joining surfaces of the first and second collars each having formed therein radially-aligned grooves which, when the collars are brought into contact with one another, define seal receiving means, a seal comprising a substantially rigid first seal component in the form of a substantially rigid ring the width of which is slightly less than the combined width of the grooves in the two collars and the outer diameter of which is such that the ring is a push-fit into the receiving means, said seal further comprising a resilient second seal component, the seal being positioned within the seal receiving means to extend partially into both receiving portions thereof and to seal between the joining surfaces of the first and second collars, and means for securing together the first and second collars, characterised in that the second seal component comprises a resilient ring of substantially inverted U-shape in transverse section the width of which is slightly more than the combined width of the grooves in the two collars, and the internal diameter of which is slightly larger than the minimum diameter of each groove.

In use, the seal is positioned in the groove of a first of the collars. Due to the size of the seal, a part of the seal extends beyond said receiving portion in the first collar. This protruding part is used to locate the second collar relative to the first collar by positioning the second collar such that the remaining part of the seal is located within the groove in said second collar. Thus the arrangement provides a convenient method of positively aligning two pipe lengths to be joined to form a pipeline system.

The resilient ring is secured within the first, rigid seal component and thus the rigid component forms the outer periphery of the seal.

In use, the U-shaped resilient seal component reacts to pressures from within the pipe lengths and increases its seal efficiency as pressure increases.

A further advantage of the pipe coupling according to the present invention is that adjacent pipe lengths can be rotated relative to one another without the need for uncoupling.

DETAILED DESCRIPTION OF THE PREFERRED EMBODIMENT

Figure 1:
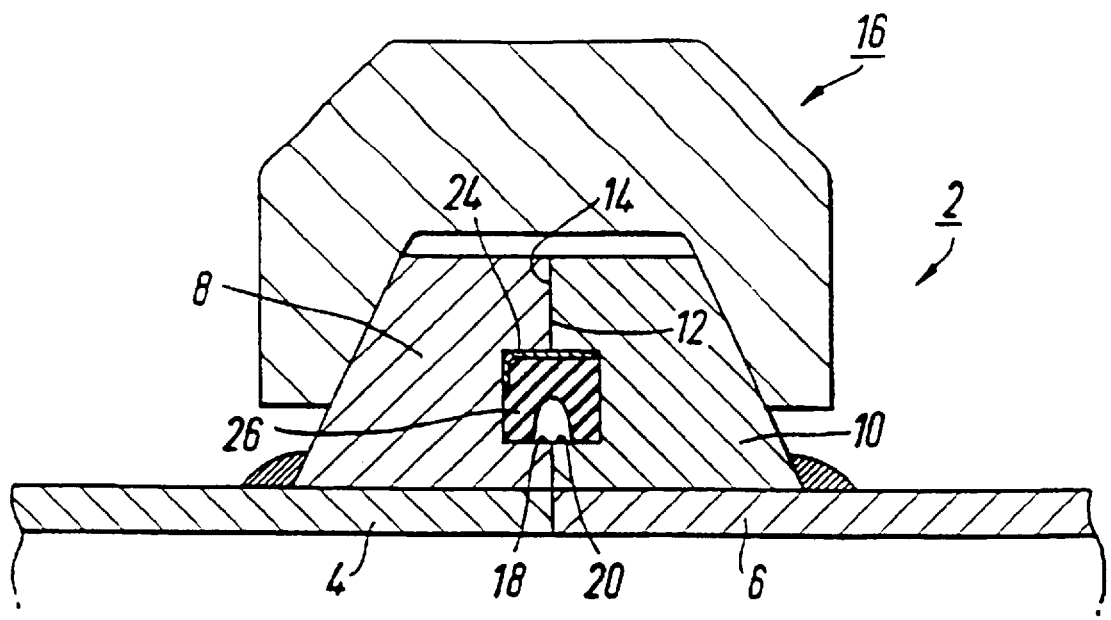
FIG.1 is a schematic longitudinal section through part of a pipe coupling according to the present invention.
Figure 2:
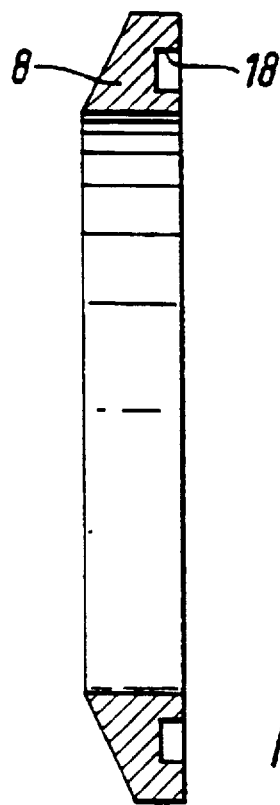
FIG. 2 is a schematic transverse section through a collar forming part of the pipe coupling in FIG. 1.
Figure 3:
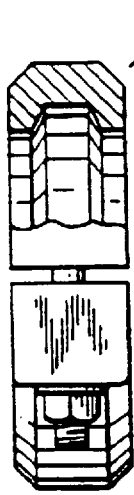
FIGS. 3 and 4 are a side view and a front view respectively of a clamp forming part of the pipe coupling of FIG. 1.
Figure 4:
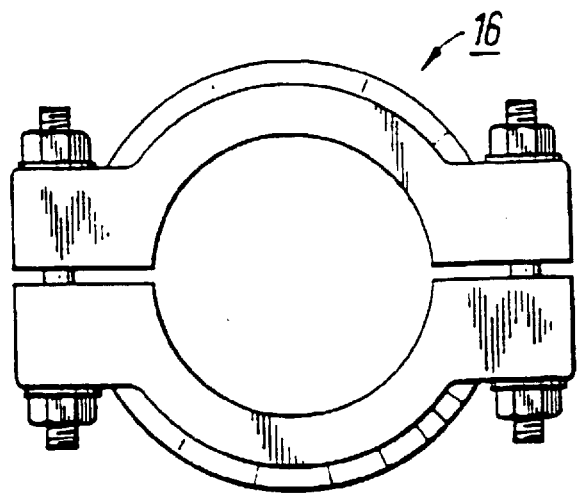
Figure 5:
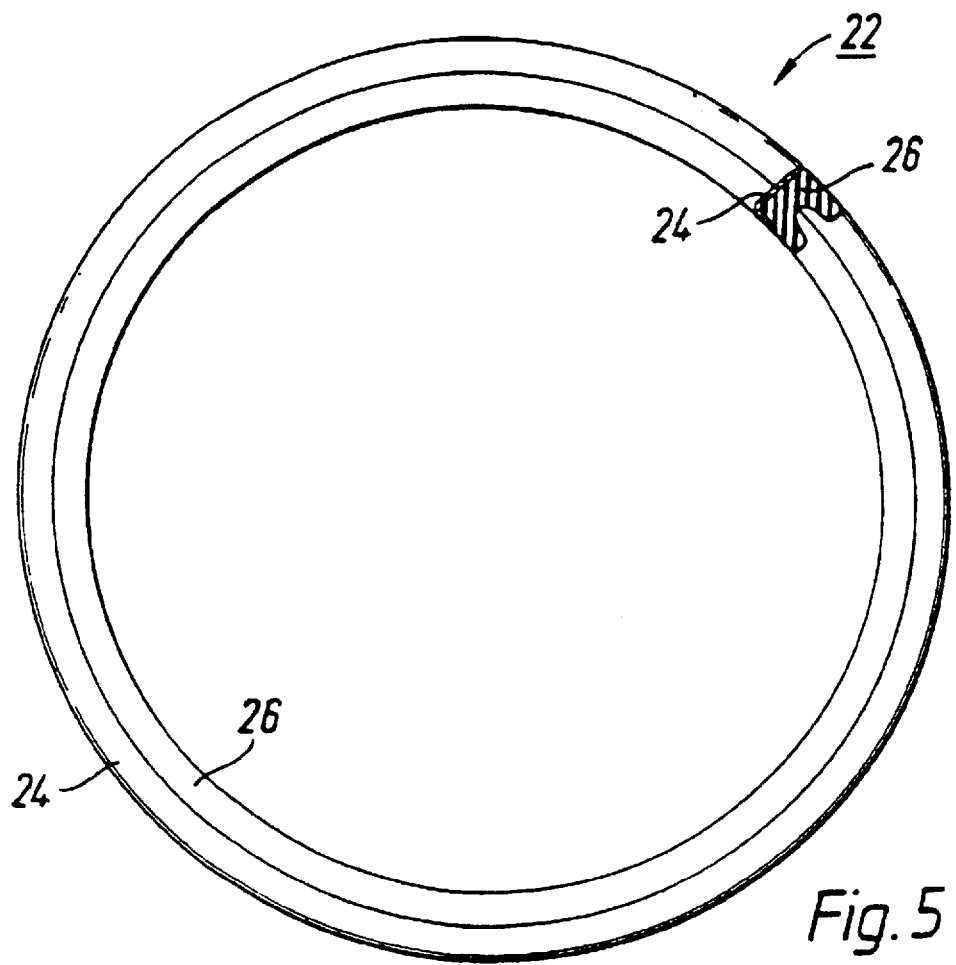
FIG. 5 is a front view, incorporating a transverse section, of the seal forming part of the pipe coupling of FIG. 1.

Referring to the drawings, a pipe coupling according to the present invention is designated generally by the reference numeral 2. The pipe coupling comprises a first length of pipe 4 and a second length of pipe 6 a wall of each of which is shown in FIG. 1 and to the end of each of which are welded associated annular collars 8, 10 respectively. The collars have respective joining surfaces 12, 14 thereon arranged to abut one another on coupling together of the pipe lengths 4, 6.

The rear face of each collar 8, 10 is of an outwardly and forwardly tapering nature, the collars 8, 10 being held together by a clamp indicated generally at 16 and provided with a correspondingly tapered clamping surface therein.

The joining surfaces 12, 14 of the collars 8, 10 each have formed therein a circular groove or channel 18, 20 respectively, the two grooves 18, 20 being accurately radially aligned with one another to form seal receiving means into which can be positioned a seal indicated generally at 22.

More particularly, the seal 22 comprises an outer metal ring 24 of substantially rigid, corrosive-resistant material and of generally L-shaped in transverse section to which is bonded an inner ring 26 of a flexible material such as plastics or rubber and of generally inverted U-shape in transverse section, the flexible ring 26 and the metal ring 24 forming a unitary seal.

The width of the metal ring 24, considered in the axial direction of the coupling, is slightly less than the combined depth of the two grooves 18, 20 constituting the seal receiving means, typically 0.13 mm less, while the diameter of the metal ring 24 is such that it is a push-fit into one or other of the grooves 18, 20 to project partially therefrom.

The width of the flexible ring 26, again considered in the axial direction of the coupling, is slightly more than the combined depths of the two grooves 18, 20, while the internal diameter of said ring 26 is slightly larger than the common minimum diameter of the grooves 18, 20.

In order to achieve a sealed coupling between the two pipe lengths 4, 6, the seal 22 is pushed into the groove 18 in the collar 8 so that it seats in said groove and projects partially therefrom.

The other collar 10 is then pushed onto the protruding part of the seal 22. The rigid nature of the portion 24 of the seal, and the accurate radial alignment of the two grooves 18, 20 ensure that the two pipe lengths 4, 6 are then accurately aligned with one another with the internal bores thereof forming accurate continuations of one another.

The portions of the clamp 16 are then positioned over the abutting collars 8, 10 and are tightened up to secure the two pipe lengths 4, 6 together. The clamp 16 may be of the bolted or quick-connect type.

In an alternative embodiment of the invention, the collars 8, 10 comprise parallel-sided annular flanges secured to respective ends of the pipe lengths 4, 6, said flanges being secured together by a plurality of circumferentially-spaced bolts extending through the flanges parallel with the central axis of the pipeline and radially outwardly of the seal 22.

In all cases, the inverted U-shaped component 26 of the seal 22 reacts to the pressure of fluid within the pipeline, said pressure being exerted on the concave surface of the ring 26 to urge the outer walls of the ring 26 against the base walls of the two grooves 18, 20 to seal between the two surfaces 12, 14. Thus it will be appreciated that in fact the efficiency of this seal increases with increase of pressure within the pipeline.

A coupling according to the invention is suitable for pipelines being used to transport, for example, liquids or slurries at high pressure of typically up to 350 bars or higher. However, it can be used at lower pressures, for example 10 bars.

Two pipe lengths coupled by means of the clamp 16 may be rotated relative to one another without having to decouple the pipe lengths, it merely being necessary to loosen the clamping effect of the clamp 16.

I claim:

1. A pipe coupling for coupling together first and second lengths of pipe, the coupling comprising a first collar secured to an end of the first length of pipe and having a joining surface thereto, a second collar secured to an end of the second length of pipe and having a joining surface thereto, the first and second collars being positioned such that, when adjacent ends of the first and second pipe lengths are brought into contact with one another, the joining surfaces of the first and second collars also contact one another, the joining surfaces of the first and second collars each having formed therein, at regions intermediate the lengths thereof, radially-aligned grooves each of generally channel section opening in directions extending axially of the pipe lengths which, when the collars are brought into contact with one another, define seal receiving means in the form of an annular chamber of generally rectangular transverse section, a seal comprising a first seal component in the form of a substantially rigid ring the width of which is slightly less than the combined depths of the grooves in the two collars, and the outer diameter of which is such that the ring is a push-fit into one of the grooves, said seal further comprising a second seal component in the form of a resilient ring of substantially U-shape in transverse section the opening in which extends in a direction radially inwardly of the pipe lengths, the width of the resilient ring being slightly more than the combined depths of the grooves and the internal diameter of which is slightly larger than the minimum diameter of the annular chamber, the arrangement being such that, on assembly of the coupling, the first and second components of the seal are positioned within the groove in the collar of one of the pipe lengths to protrude partially there from, the groove in the collar of the other pipe length being positioned over the protruding portion of the seal to align said other pipe length radially relative to the one pipe length, means being provided to secure together the first and second collars of the aligned pipe lengths whereby the resilient ring is compressed to seal between the joining surfaces of the first and second collars.

2. A coupling as claimed in claim 1 in which the means for securing the two collars together comprises a clamp embracing said collars.

3. A coupling as claimed in claim 1 in which the means for securing the two collars together comprise a plurality of circumferentially-spaced bolts extending through the collars axially thereof.

4. A method of effecting a coupling between first and second lengths of pipe, using a coupling comprising a first collar secured to an end of the first length of pipe and having a joining surface thereto, a second collar secured to an end of the second length of pipe and having a joining surface thereto, the joining surfaces of the first and second collars each having formed therein, at regions intermediate the lengths thereof, radially aligned grooves, each of generally channel section opening in directions extending axially of the pipe lengths, a seal comprising a first seal component in the form of a substantially rigid ring the width of which is slightly less than the combined depths of the grooves in the two collars, and the outer diameter of which is such that the ring is a push-fit into one of the grooves, said seal further comprising a second seal component in the form of a resilient ring of substantially U-shape in transverse section the opening in which extends in a direction radially inwardly of the pipe lengths, the width of the resilient ring being slightly more than the combined depths of the grooves and the internal diameter of which is slightly larger than the minimum diameter of the annular chamber, the method comprising the steps of:

(1) positioning the first and second components of the seal within the groove in the collar of one of the pipe lengths to protrude partially therefrom;

(2) positioning the groove in the collar of the other pipe length over the protruding portion of the seal to align said other pipe length radially relative to the one pipe length; and (3) securing together the first and second collars of the aligned pipe lengths whereby the resilient ring is compressed to seal between the joining surfaces of the first and second collars, said joining surfaces abutting one another and whereby the opposed grooves define a continuous annular chamber of generally rectangular configuration.

* * * * *